Figure 1:
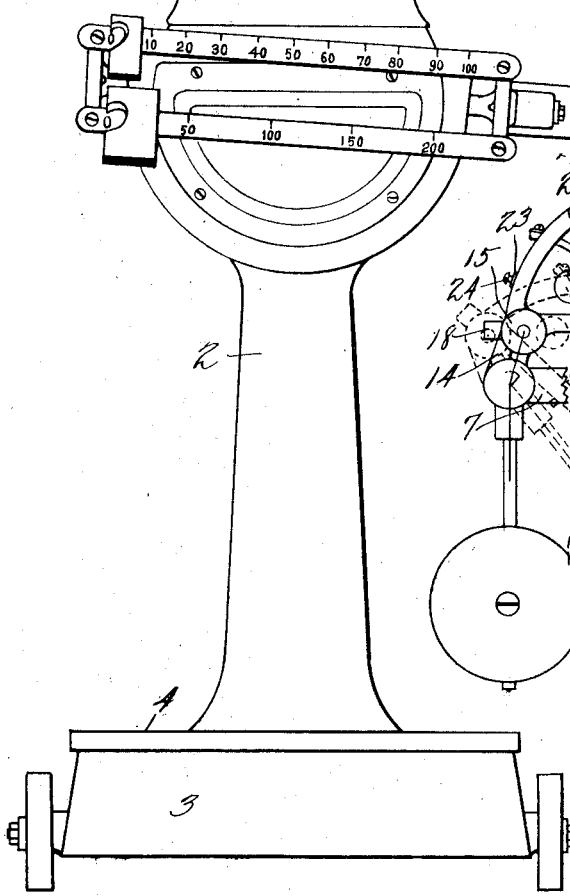

H. S. BERGEN.
WEIGHING SCALE.
APPLICATION FILED OCT. 23, 1916.

1,360,172.

Patented Nov. 23, 1920.
2 SHEETS—SHEET 1.

INVENTOR.
Harry S. Bergen
By George R. Frye.
Atty.

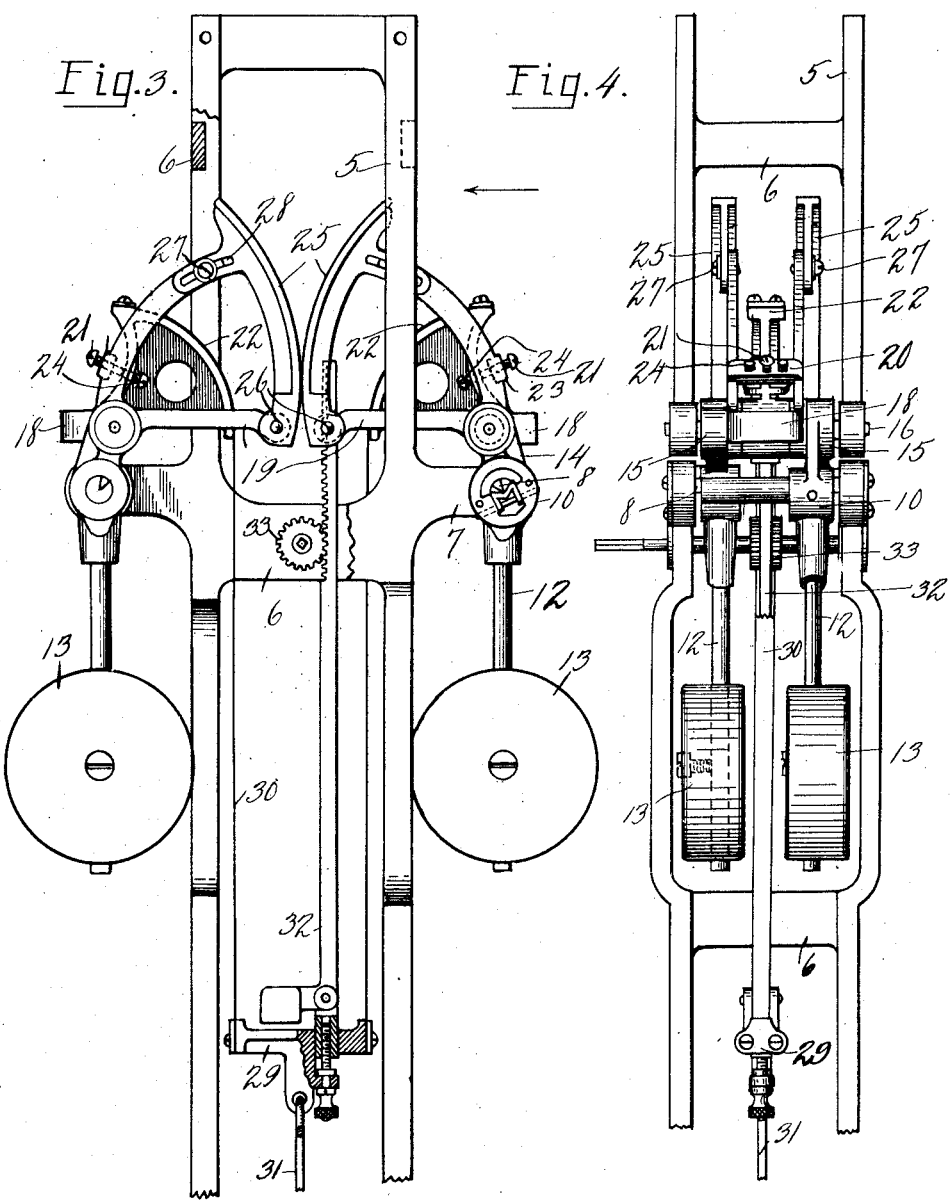

UNITED STATES PATENT OFFICE.

HARRY S. BERGEN, OF TOLEDO, OHIO, ASSIGNOR TO TOLEDO SCALE COMPANY, OF TOLEDO, OHIO, A CORPORATION OF NEW JERSEY.

WEIGHING-SCALE.

1,360,172.   Specification of Letters Patent.   Patented Nov. 23, 1920.

Application filed October 23, 1916. Serial No. 127,251.

*To all whom it may concern:*

Be it known that I, HARRY S. BERGEN, a citizen of the United States, residing at Toledo, in the county of Lucas and State of Ohio, have invented certain new and useful Improvements in Weighing-Scales, of which the following is a specification.

This invention relates to weighing scales, and more particularly to the weighing mechanisms thereof.

My invention is adaptable for use in many different types of scales but is of special benefit when employed in connection with scales of the pendulum type. One of the characteristics of scales of this type is that the scale must be maintained in level position with respect to the vertical, otherwise the weighing would be inaccurate in operation and the zero mark of the scale would not be accurately indicated by the index hand. My invention aims to overcome this objection by providing a means whereby a pair of pendulums moving simultaneously in opposite directions conjointly affect and equalize the movement transmitted to the index hand.

Among the objects of this invention are the provision of a self-compensating pendulum weighing mechanism having fixed fulcrums and directly contacting parts; the arrangement of a weighing mechanism whereby the pull exerted upon the pendulum weighing mechanism is directly applied to the indicating mechanism; and the provision of a simple and efficient weighing mechanism in a compact space.

With the above and other objects in view which will be apparent as the description progresses, my invention consists in the novel construction, combination and arrangement of parts to be hereinafter more fully described and particularly pointed out in the appended claims.

Reference is to be had to the accompanying drawings illustrating a preferred embodiment of my invention, and wherein similar reference characters designate similar parts throughout the several views.

In the drawings:—

Figure 2:
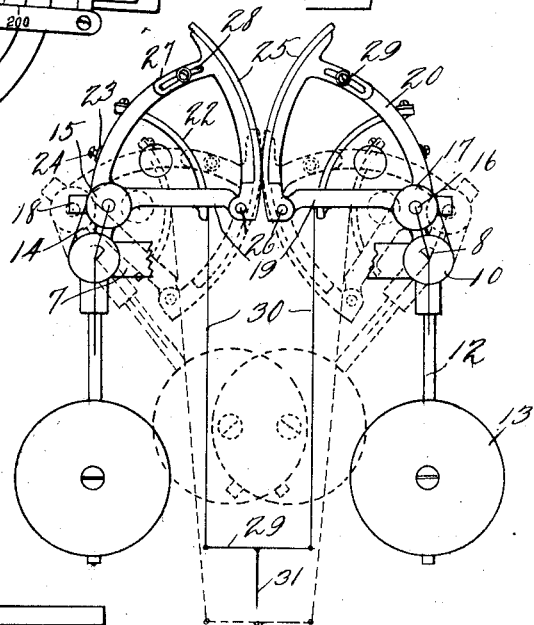

Figure 1 is a front elevation of my improved scale; Fig. 2 is a diagrammatic view illustrating the positions assumed by the operating parts; Fig. 3 is an enlarged front elevation of the pendulum mechanism and supporting frame; Fig. 4 is a side elevation thereof; and Fig. 5 is a detail perspective view of the supporting bracket.

Referring more particularly to the drawing, 1 designates the housing adapted to inclose the weighing mechanism of the scale and supported upon the usual column 2, the lower end thereof communicating with the usual base 3 inclosing the platform levers (not shown) upon which the platform 4 is supported. The weighing mechanism of the scale is mounted upon a frame supported in the housing 1 and comprising four pillars 5 connected together by cross-bars 6. The pillars 5 are each formed with a lug 7 adjacent the central cross-bar 6 carrying bearings adapted to receive the knife edge pivots 8 of the pendulum hubs 9. Sleeves 10 are mounted on the hubs 9 diagonally opposite each other, and carry the pendulum stems 12 on which the pendulum weights 13 are adjustably mounted. The sleeves 10 are further provided with levers 14 having bearings 15 adapted to receive the shafts 16 of the oppositely-disposed contact arms. The contact arms comprise a bracket having a cross-bar 18 and substantially V-shaped side members 17 mounted at their apices upon the shaft 16. As herein shown, one arm of each of the side members 17 is normally horizontal, while the other arm is of arcuate formation, curving upwardly from the apex to a position radially farther from the shaft 16 than the end of the horizontal arm. Each arm is provided with an aperture 19 at its extremity. A cross-bar 20 is formed between the two arms 17 above the shaft 16 and is adapted to receive adjustment screws 21 for the purpose hereinafter set forth. A segment 22 is mounted upon the shaft 16 intermediate the V-shaped side members and has formed on its rear edge lugs 23 carrying adjustment screws 24 bearing against the cross-arm 20. The adjustment screw 21 in turn bears against the rear edge of the segment 22, strengthening the connection between the segments and side members 17 and providing means whereby the usual pendulum cam adjustments are made.

Members having arcuate contact faces 25 are pivotally connected to the inner extremities of the arms 17 and are provided with slotted projections 26 adapted to aline with and be adjustably connected with the upper ends of the arms 17. Locking bolts 27 are preferably inserted through the slots 28 and thread into the apertures 19 to clamp the upper extremities of the contact faces of the members in any adjusted position. The arcuate faces 25 provide an eccentric contacting surface, the upper extremity of which is the farther spaced from the shaft 16, the radial distance decreasing to that of the lower arm and face, so that as the contacting faces move downwardly in the operation of the scale the radii to the centers of the shafts 16 increase and the shafts are forced outwardly, swinging the pendulums inwardly and upwardly, as shown in dotted lines in Fig. 2.

A flexible operating means is provided and comprises an equalizing bar 29 connected to the upper portion of the segments 22 by means of thin, metallic ribbons 30. The equalizing bar 29 is pivotally connected to the platform levers (not shown) by means of a steelyard 31. The bar 29 further carries a vertically disposed rack bar 32 meshing with a pinion 33 journaled in the cross-bar 6. The pinion 33 is fixed on the same shaft carrying the index hand 34 pivoted concentrically of the dial 35 bearing the weight indications.

The operation of my improved weighing mechanism will be clearly understood with reference to Fig. 2. The pendulum hubs 9 are mounted in the lugs 7 and carry the V-shaped members. The contacting members 25 are moved downwardly by means of the flexible operating means exerting a pull on the segments 22, and as the radial distances increase, the contacting faces force the shafts 16 outwardly, causing the pendulums to swing inwardly and upwardly, substantially as shown in dotted lines.

While it will be apparent that the illustrated embodiment of my invention herein disclosed is well calculated to adequately fulfil the objects primarily stated, it is to be understood that my invention is susceptible to modification, variation and change without departing from the spirit and scope of the invention as set forth in the subjoined claims.

Having described my invention, I claim:

1. In a weighing scale and in combination with the indicating mechanism thereof, a weighing mechanism comprising a pair of oppositely-disposed weight-supporting elements having contacting parts thereon arranged to progressively separate the supporting elements in the operation of the scale, an adjustable weight secured to each of said supporting elements, flexible means adapted to operate said elements and connections from said means to the indicating mechanism of the scale.

2. In a weighing scale and in combination with the indicating mechanism thereof, a weighing mechanism comprising a pair of oppositely-disposed weight-supporting elements having contacting parts, an adjustable weight secured to each of said supporting elements, an equalizing bar flexibly connected to said supporting elements, and means connected with said bar adapted to operate the indicating mechanism of the scale.

3. In a weighing scale, a weighing mechanism comprising a pair of oppositely-disposed weight-supporting elements, weights secured to said supporting elements, flexible operating means connected to said supporting elements, and coacting means adjustably secured to said supporting elements whereby the weights of the supporting elements will be forced inwardly and upwardly to offset the weight of a load.

4. In a weighing scale, a weighing mechanism comprising a pair of oppositely-disposed weight-supporting elements, an adjustable weight secured to each of said supporting elements, means flexibly connected to and adapted to operate said supporting elements, contacting members pivotally connected to said supporting elements, and means whereby one of the ends of said contacting members is adjustably mounted upon said supporting elements.

5. In a weighing scale, a weighing mechanism comprising a pair of oppositely-disposed weight-supporting elements, an adjustable weight secured to each of said supporting elements, means flexibly connected to and adapted to operate said supporting elements, contacting members pivotally connected to said supporting elements, and means for adjustably connecting said contacting members to said supporting elements whereby the contact faces thereof are eccentric to their respective shafts.

6. In a weighing scale, a weighing mechanism comprising a pair of oppositely-disposed weight-supporting elements, an adjustable weight secured to each of said supporting elements, means flexibly connected to and adapted to operate said supporting elements, contacting members pivotally connected to said supporting elements, and means for adjustably connecting said contacting members to said supporting elements whereby the contact faces thereof are eccentric to their respective shafts and adjustable to vary the effective radii from the contact members to their respective shafts.

7. In a weighing scale, a weighing mechanism comprising a pair of shafts pivoted within the scale, a pair of supporting members secured above and inwardly of said shaft, weights depending from each of said shafts, operating means flexibly connected to said supporting members, contact members carried by said supporting members, and means for adjusting the positions of said contact members.

8. In a weighing scale, a weighing mechanism comprising a pair of shafts pivoted within the scale, a pair of supporting members carried by the shafts and positioned above and inwardly of the shafts, weights depending from each of said shafts, a segment mounted upon each supporting member, means flexibly connected to said segments adapted to establish an operative connection therewith, contact members carried by said supporting members, and means for adjusting the positions of said contact members.

9. In a weighing scale, a weighing mechanism comprising a pair of shafts pivoted within the scale, a pair of supporting members carried by the shafts and positioned above and inwardly of the shafts, weights depending from each of said shafts, a segment mounted upon each supporting member, means secured in each supporting member and segment adapted to establish an adjustable connection therebetween, contact members carried by said supporting members, and means for adjusting the positions of said contact members.

10. In a scale, a pair of pendulums provided with cams having their adjacent faces contacting and arranged to progressively swing the pendulums as the cams are rocked in the operation of the scale, and connections from the scale platform for rocking said cams.

11. In a scale, a pair of pendulums fulcrumed within the scale, weights carried by the pendulums below the fulcrums thereof, cams carried by the pendulums above their fulcrums and having their adjacent faces in contact, said cams being shaped and arranged to progressively swing the pendulums as the cams are rocked, and connections from the scale platform for rocking the cams.

HARRY S. BERGEN.

Witnesses:
GEORGE R. FRYE,
C. F. MILLER, Jr.